US012658627B2

(12) United States Patent
(10) Patent No.: US 12,658,627 B2
(45) Date of Patent: Jun. 16, 2026

Fu et al.

(54) CONNECTOR ASSEMBLY

(71) Applicant: Tyco Electronics (Shanghai) Co., Ltd., Shanghai (CN)

(72) Inventors: Xiaozhi (George) Fu, Shanghai (CN); Wei Zhang, Shanghai (CN); Dingbing (Frank) Fan, Shanghai (CN); Wei (Rock) Lv, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 322 days.

(21) Appl. No.: 18/335,510

(22) Filed: Jun. 15, 2023

(65) Prior Publication Data

US 2023/0411891 A1 Dec. 21, 2023

(30) Foreign Application Priority Data

Jun. 15, 2022 (CN) ......................... 202221498963.5

(51) Int. Cl.

*H01R 13/28* (2006.01)
*H01R 12/72* (2011.01)
*H01R 12/73* (2011.01)
*H01R 13/631* (2006.01)

(52) U.S. Cl.

CPC ........... *H01R 13/28* (2013.01); *H01R 12/727* (2013.01); *H01R 12/73* (2013.01); *H01R 13/631* (2013.01)

(58) Field of Classification Search

CPC .... H01R 13/28; H01R 13/631; H01R 12/727; H01R 12/73

See application file for complete search history.

(56) References Cited

U.S. PATENT DOCUMENTS

| | | | | | |
|---|---|---|---|---|---|
| 2,838,739 | A * | 6/1958 | Winkler | H01R 13/26 | 439/295 |
| 3,091,746 | A * | 5/1963 | Winkler | H01R 13/28 | 439/744 |
| 3,259,870 | A * | 7/1966 | Winkler | H01R 13/28 | 439/701 |
| 3,794,957 | A * | 2/1974 | Winkler | H01R 13/28 | 439/679 |
| 3,909,099 | A * | 9/1975 | Winkler | H01R 24/84 | 439/295 |
| 4,335,931 | A * | 6/1982 | Kinnear | H01R 13/28 | 439/744 |
| 4,737,118 | A * | 4/1988 | Lockard | H01R 24/84 | 439/594 |
| 4,963,102 | A * | 10/1990 | Gettig | H01R 24/84 | 439/291 |
| 4,990,099 | A * | 2/1991 | Marin | H01R 13/642 | 439/221 |

(Continued)

*Primary Examiner* — Harshad C Patel
(74) *Attorney, Agent, or Firm* — Barley Snyder

(57) ABSTRACT

A connector assembly has a first connector and a second connector. The first connector includes a first housing and a first terminal arranged in the first housing. The first terminal includes a first terminal mating portion. The second connector includes a second housing and a second terminal arranged in the second housing. The second terminal includes a second terminal mating portion that corresponds to the first terminal mating portion. The first terminal mating portion is identical to the second terminal mating portion but is inverted 180 degrees relative to the second terminal mating portion.

19 Claims, 8 Drawing Sheets

(56) References Cited

U.S. PATENT DOCUMENTS

| | | | | | |
|---|---|---|---|---|---|
| 5,344,335 | A * | 9/1994 | Scholz | H01R 13/28 | 439/357 |
| 5,520,545 | A * | 5/1996 | Sipe | H01R 13/28 | 439/74 |
| 5,575,674 | A * | 11/1996 | Davis | H01R 24/84 | 439/573 |
| 5,611,711 | A * | 3/1997 | Okada | H01R 12/727 | 439/607.08 |
| 5,667,393 | A * | 9/1997 | Grabbe | H01R 13/41 | 600/443 |
| 6,048,213 | A * | 4/2000 | Lai | H01R 12/52 | 439/74 |
| 6,540,529 | B1 * | 4/2003 | Yu | H01R 13/28 | 439/74 |
| 7,374,460 | B1 * | 5/2008 | Hariharesan | H01R 13/642 | 439/691 |
| 7,618,279 | B1 * | 11/2009 | Osborn, Jr. | H01R 13/26 | 439/441 |
| 7,628,630 | B2 * | 12/2009 | Chang | H01R 13/426 | 439/862 |
| 9,664,197 | B2 * | 5/2017 | Walker | F04D 25/0693 | |
| 9,882,324 | B2 * | 1/2018 | Shi | H01R 24/84 | |
| 2006/0178029 | A1 * | 8/2006 | Fabian | H01R 13/642 | 439/284 |
| 2015/0255923 | A1 * | 9/2015 | Xu | H01R 4/4821 | 439/345 |
| 2019/0267725 | A1 * | 8/2019 | Zhang | H01R 13/432 | |

* cited by examiner

CONNECTOR ASSEMBLY

CROSS-REFERENCE TO RELATED APPLICATION

This application claims the benefit of the filing date under 35 U.S.C. § 119(a)-(d) of Chinese Patent Application No. 202221498963.5, filed on Jun. 15, 2022.

FIELD OF THE INVENTION

The present invention relates to a connector assembly.

BACKGROUND

In prior art, board to board connectors typically include male and female connectors. Male and female connectors are installed on two circuit boards respectively. When male and female connectors are mated, electrical connection between two circuit boards can be achieved. However, in the prior art, terminals in the male connector are completely different from terminals in the female connector, requiring different manufacturing molds, and increasing the manufacturing cost.

SUMMARY

A connector assembly has a first connector and a second connector. The first connector includes a first housing and a first terminal arranged in the first housing. The first terminal includes a first terminal mating portion. The second connector includes a second housing and a second terminal arranged in the second housing. The second terminal includes a second terminal mating portion that corresponds to the first terminal mating portion. The first terminal mating portion is identical to the second terminal mating portion but is inverted 180 degrees relative to the second terminal mating portion.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
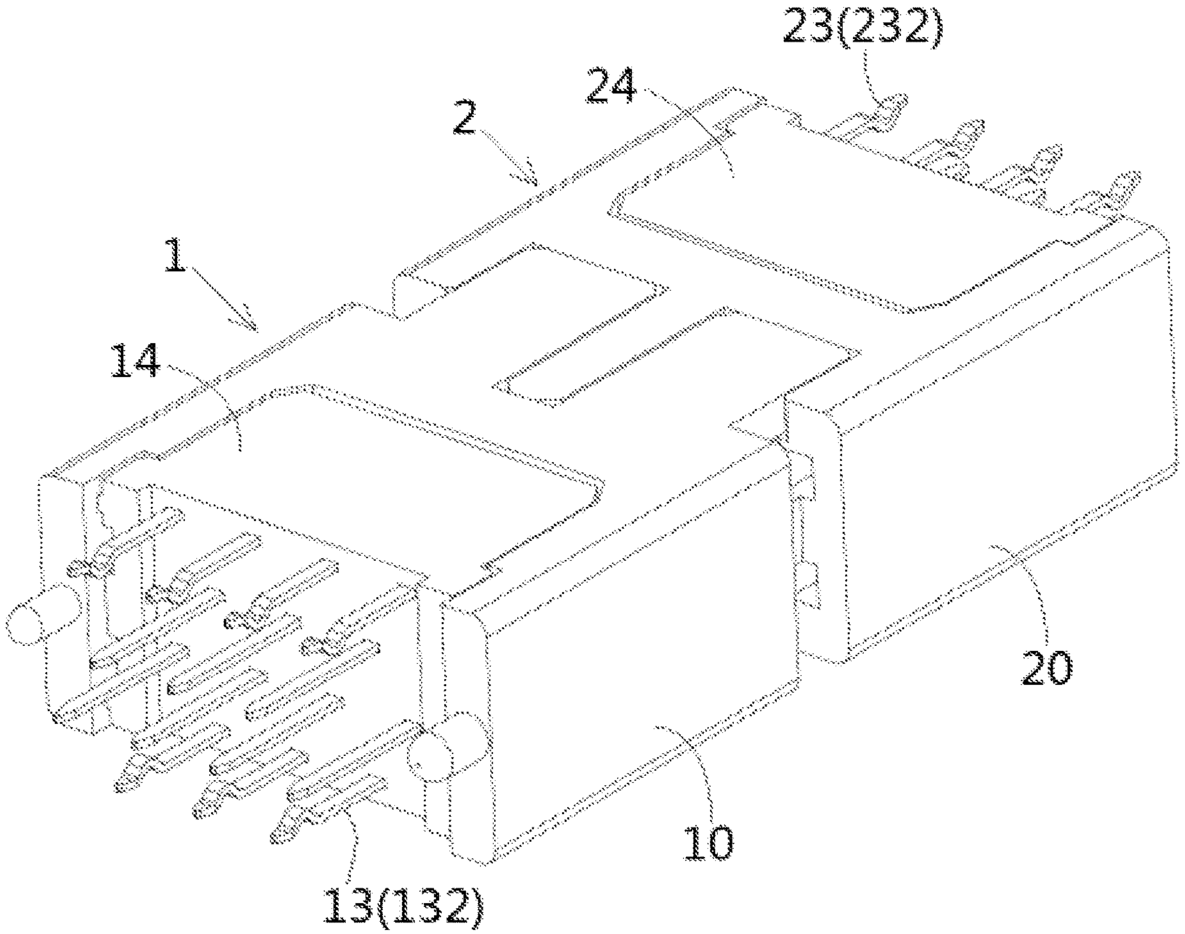
FIG. 1 is a perspective view of a connector assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIG. 1, in the illustrated embodiment, the connector assembly includes a first connector 1 and a second connector 2. The first connector 1 includes a first housing 10 and a first terminal 13 provided in the first housing 10. The second connector 2 includes a second housing 20 and a second terminal 23 provided in the second housing 20. The first terminal 13 includes a first terminal mating portion 131, and the second terminal 23 includes a second terminal mating portion 231 that matches the first terminal mating portion 131, as shown in FIGS. 2 and 3.

In the shown embodiment, the first terminal mating portion 131 is identical to the second terminal mating portion 231 but is inverted 180 degrees relative to the second terminal mating portion 231.

Figure 7:
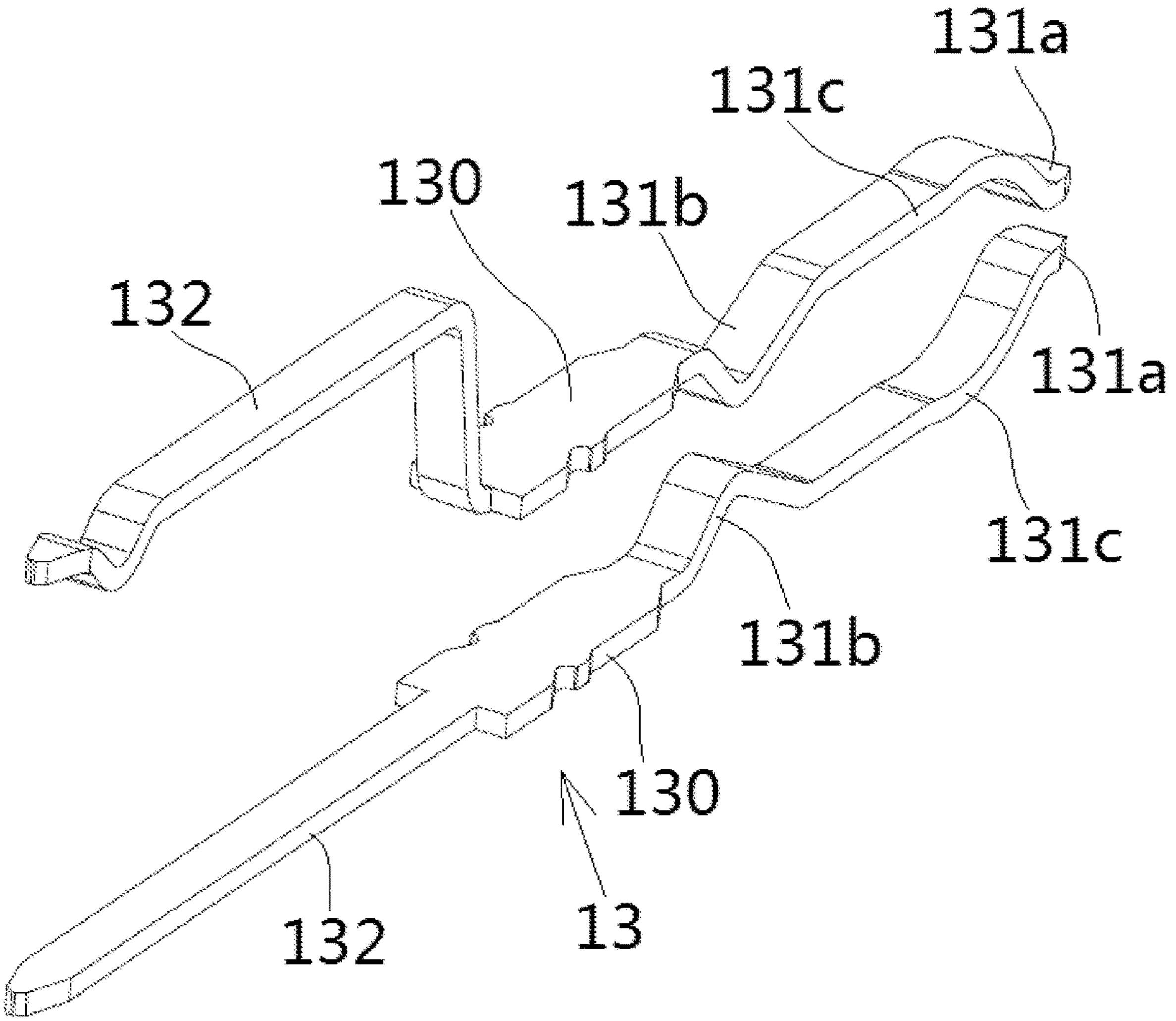
FIG. 7 is a perspective view of a first terminal according to an embodiment.
Figure 8:
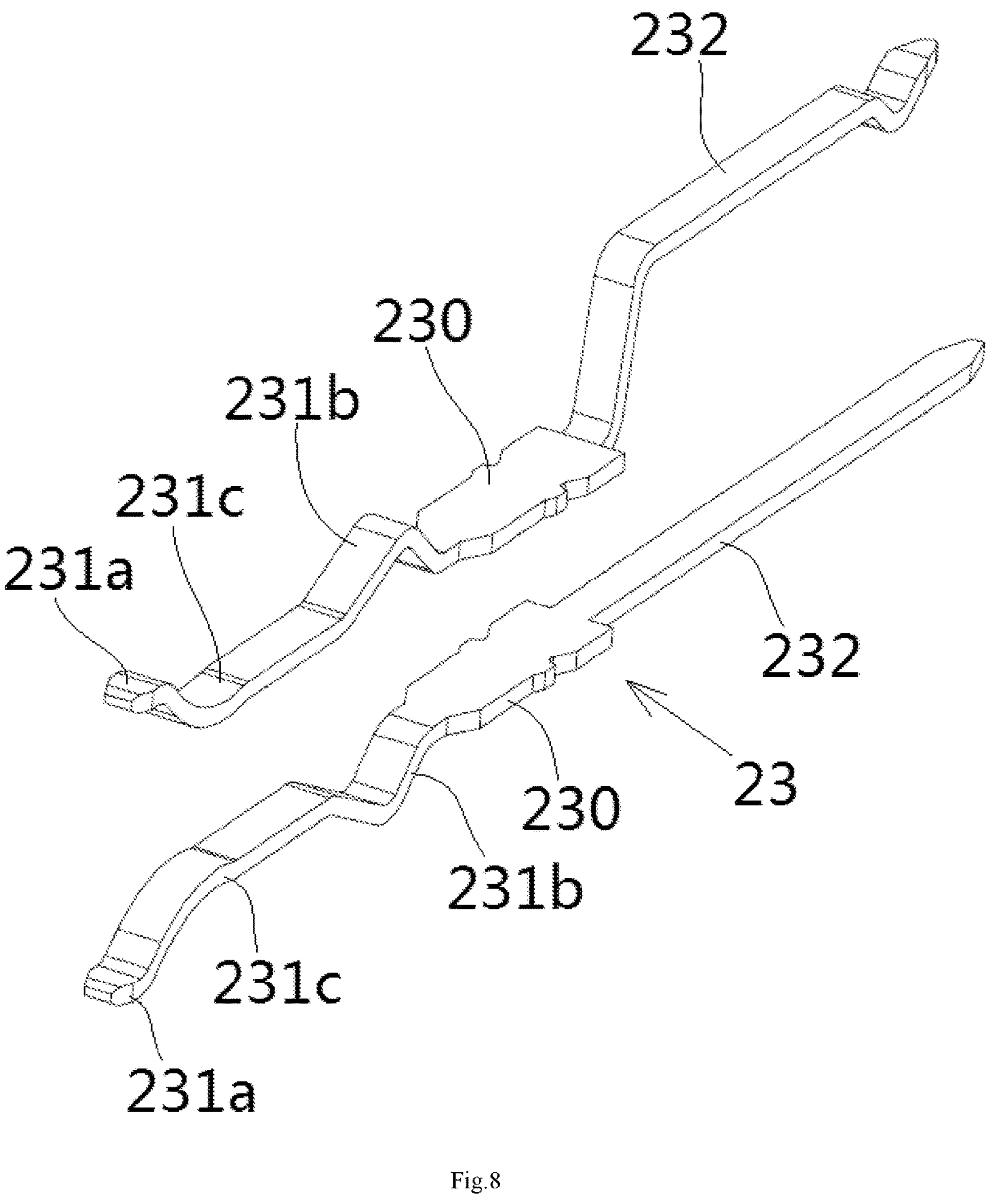
FIG. 8 is a perspective view of a second terminal according to an embodiment.

As shown in FIGS. 7 and 8, the first terminal 13 further includes a first terminal fixing portion 130 connected to the first terminal mating portion 131 and fixed in the first housing 10, and the second terminal 23 further includes a second terminal fixing portion 230 connected to the second terminal mating portion 231 and fixed in the second housing 20. The first terminal fixing portion 130 is identical to the second terminal fixing portion 230.

Figure 2:
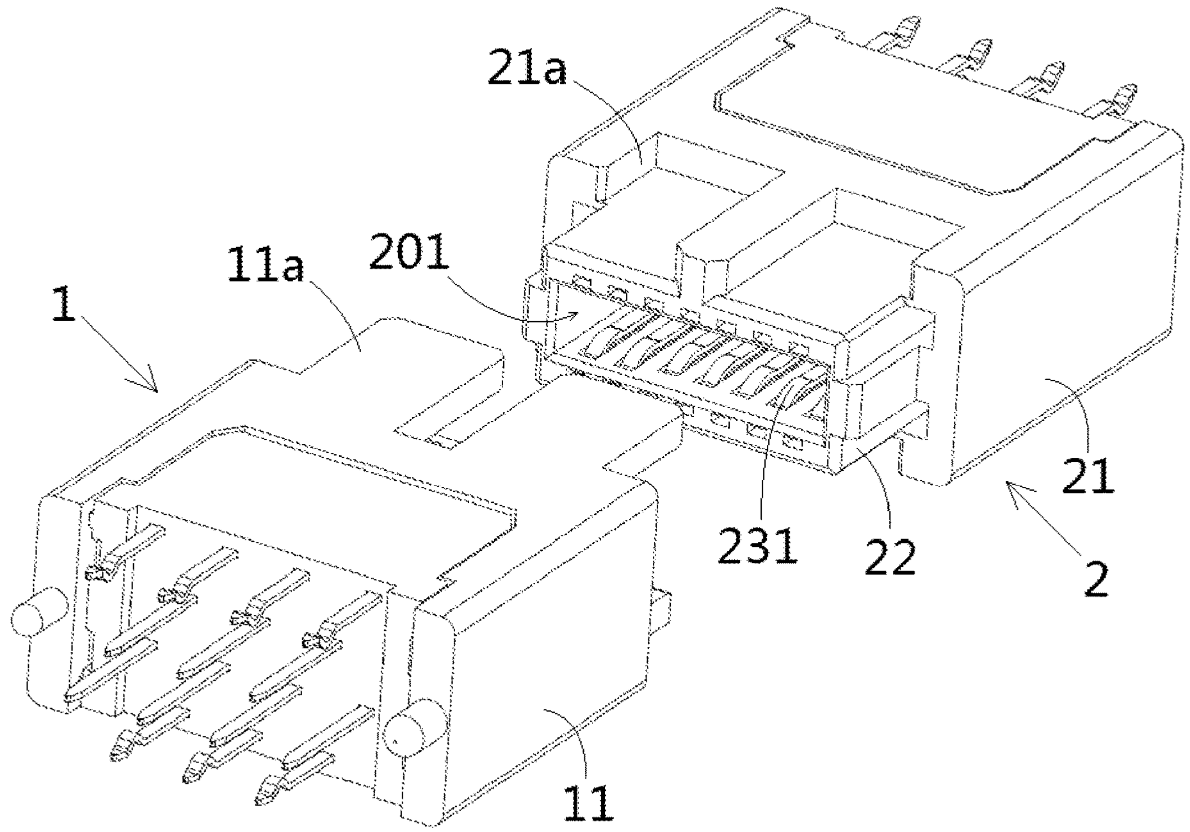
FIG. 2 is an exploded perspective view of the connector assembly.
Figure 3:
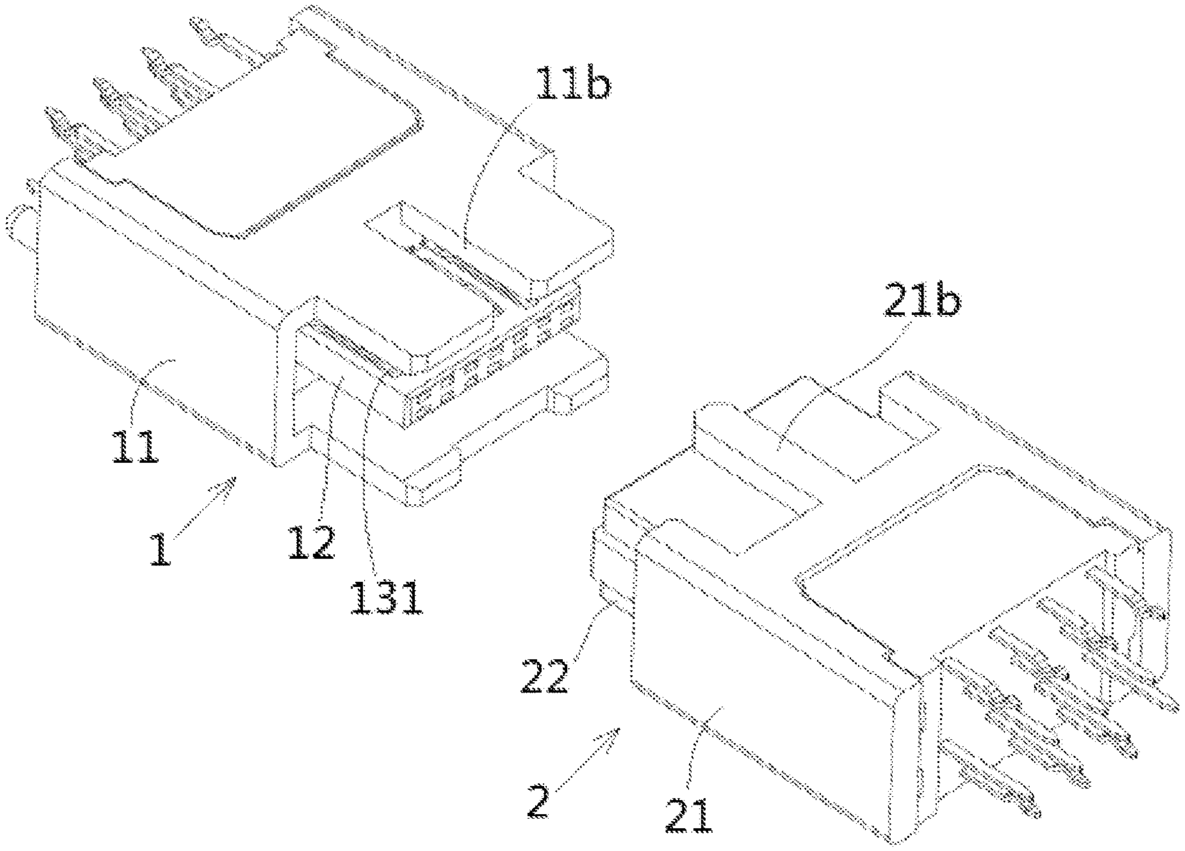
FIG. 3 is another exploded perspective view of the connector assembly.

As shown in FIGS. 2 and 3, the first housing 10 includes a first main housing 11 and a first housing mating portion 12 protruding from the front end of the first main housing 11. The first terminal mating portion 131 is provided in the first housing mating portion 12, and the first terminal fixing portion 130 is fixed in the first main housing 11. The second housing 20 includes a second main housing 21 and a second housing mating portion 22 that protrudes from the front end of the second main housing 21 and matches the first housing mating portion 12. The second terminal mating portion 231 is provided in the second housing mating portion 22, and the second terminal fixing portion 230 is fixed in the second main housing 21.

As shown in FIG. 2, a receiving cavity 201 is formed in the second housing mating portion 22, and the first housing mating portion 12 is inserted into the receiving cavity 201 of the second housing mating portion 22. A first receiving slot 121 is formed on the outer wall surface of the first housing mating portion 12, and the first terminal mating portion 131 is accommodated in the first receiving slot 121, shown in FIG. 4. A second receiving slot 221 is formed on the inner wall surface of the second housing mating portion 22, as shown in FIG. 5, and the second terminal mating portion 231 is accommodated in the second receiving slot 221.

In the illustrated embodiment, the first terminal mating portion 131 is a bent first elastic arm, and the first terminal mating portion 131 has a first contact portion 131*c* protruding from the first receiving slot 121. The second terminal mating portion 231 is a bent second elastic arm, the first terminal mating portion 131 has a second contact portion 231*c* protruding from the second receiving slot 221. The first contact portion 131*c* is in electrical contact with the second contact portion 231*c*.

The first terminal mating portion 131 also has a first connecting portion 131*b* and a first end portion 131*a* located at both ends thereof, respectively, as shown in FIG. 7. The first connecting portion 131*b* and the first end portion 131*a* are movably supported on the bottom wall surface of the first receiving slot 121 to allow elastic deformation of the first terminal mating portion 131 when pressed. The second terminal mating portion 231 also has a second connecting portion 231*b* and a second end portion 231*a* located at both ends thereof, respectively, as shown in FIG. 8. The second connecting portion 231*b* and the second end portion 231*a* are movably supported on the bottom wall surface of the second receiving slot 221 to allow elastic deformation of the second terminal mating portion 231 when pressed.

Figure 4:
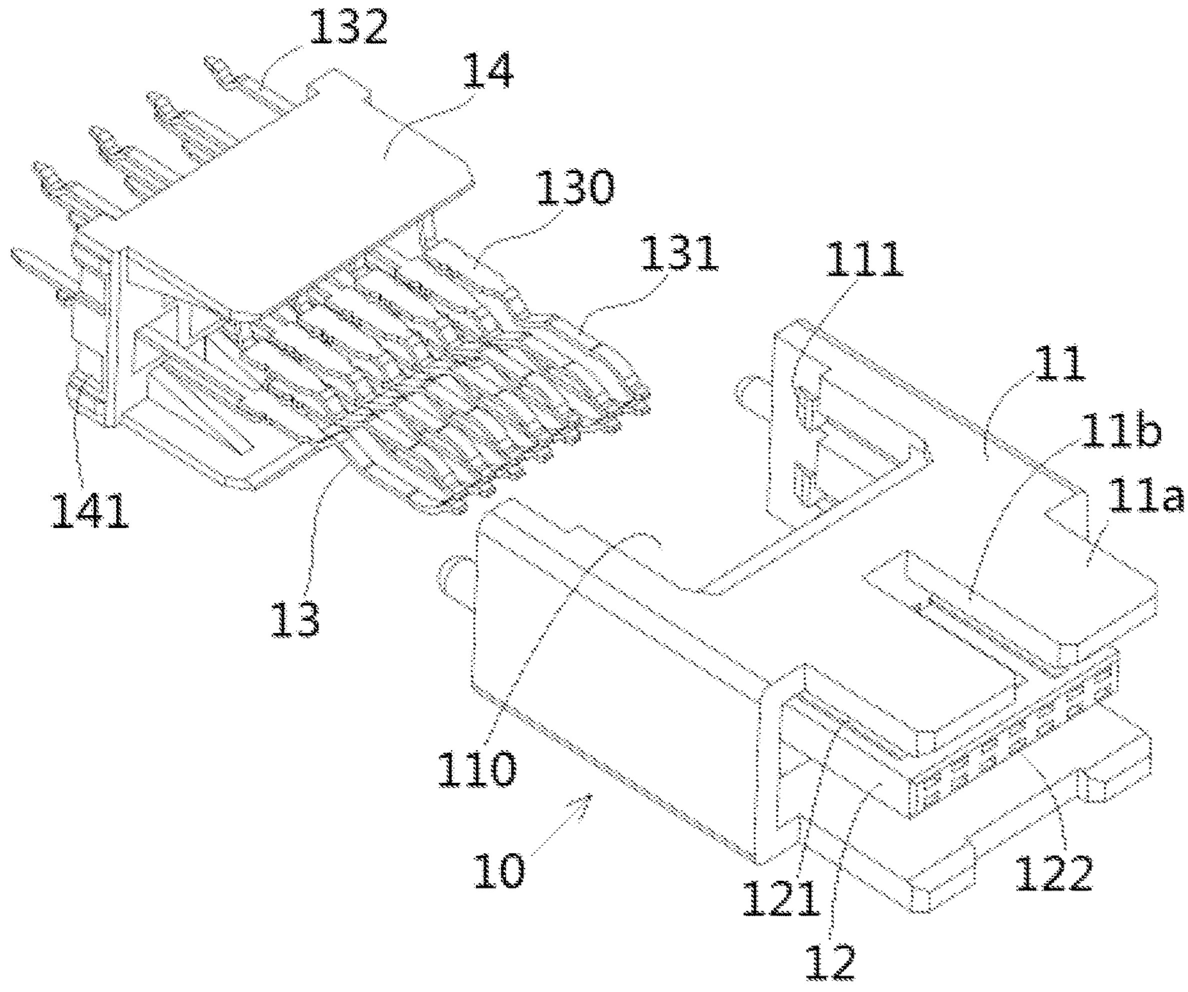
FIG. 4 is an exploded perspective view of a first connector according to an embodiment.
Figure 5:
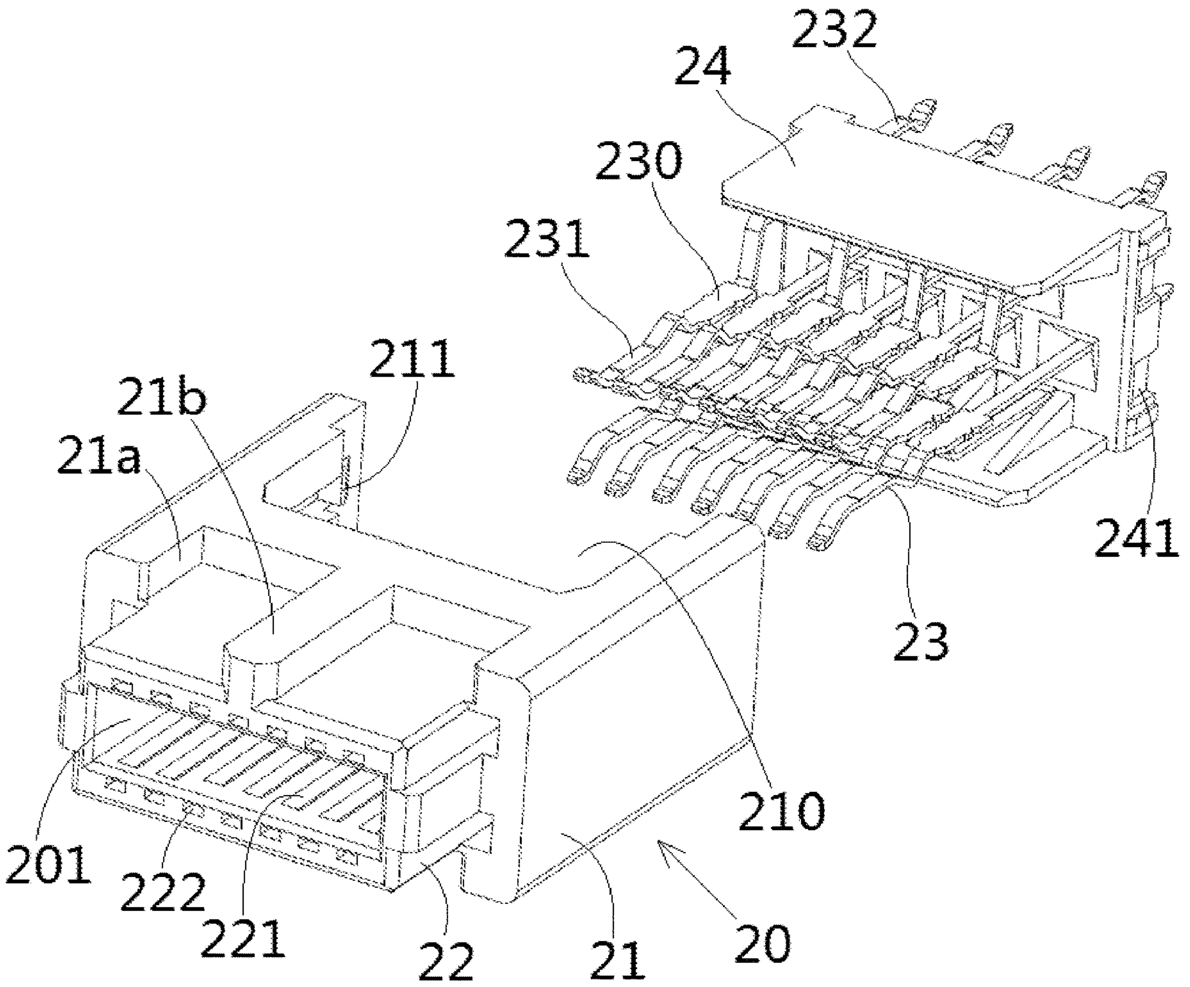
FIG. 5 is an exploded perspective view of a second connector according to an embodiment.
Figure 6:
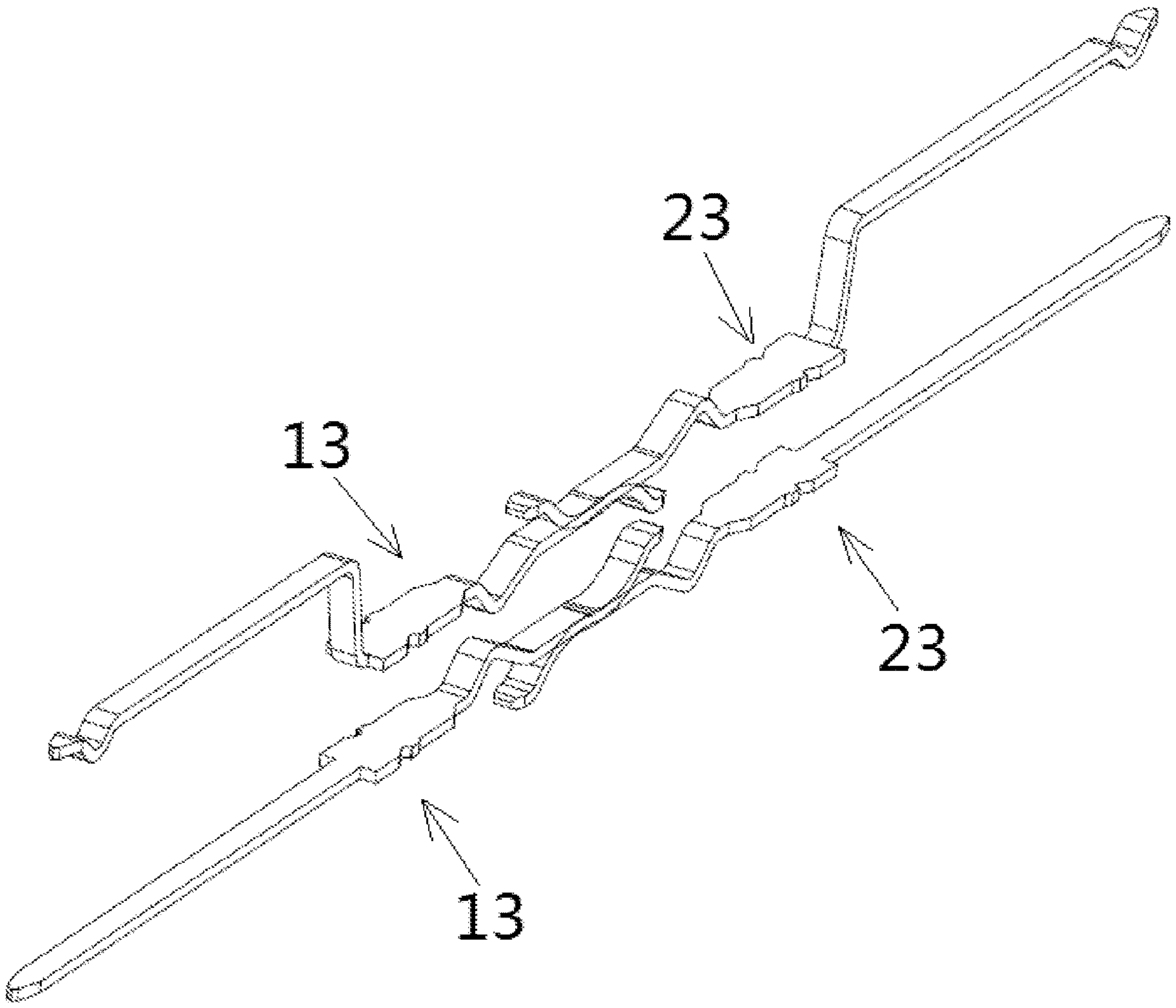
FIG. 6 is a perspective view of a plurality of first terminals and a plurality of second terminals of the connector assembly mated together.

As shown in FIG. 4, a first limit hole 122 is formed on the end surface of the first housing mating portion 12 and is in communication with the first receiving slot 121. The first end portion 131*a* of the first terminal mating portion 131 is restricted in the first limit hole 122. A second limit hole 222 is formed on the end surface of the second housing mating portion 22 and is in communication with the second receiving slot 221, and the second end portion 231*a* of the second terminal mating portion 231 is restricted in the second limit hole 222.

The first connecting portion 131*b* is connected between the first terminal fixing portion 130 and the first contact portion 131*c* and bent into a V-shaped shape, and the second connecting portion 231*b* is connected between the second terminal fixing portion 230 and the second contact portion 231*c* and bent into a V-shaped shape, as shown in FIGS. 7 and 8.

In the illustrated embodiment, the first housing 10 also includes a pair of side plates 11*a* connected to one end of the first main housing 11, the pair of side plates 11*a* are respectively located on both sides of the first housing mating portion 12 and spaced apart from the first housing mating portion 12. A pair of grooves 21*a* are formed on the outer wall surface of the second main housing 21 that are respectively matched with the pair of side plates 11*a*, and the pair of side plates 11*a* are respectively inserted into the pair of grooves 21*a*. The second housing mating portion 22 is inserted between the pair of side plates 11*a*, and the pair of side plates 11*a* are respectively against the outer wall surfaces on both sides of the second housing mating portion 22.

A guide groove 11*b*, as shown in FIG. 3, is formed on at least one of the pair of side plates 11*a*, and a convex guide rib 21*b* is formed on the outer wall surface of the second housing mating portion 22. The guide rib 21*b* is mated with the guide groove 11*b* to guide the first housing mating portion 12 into the receiving cavity 201 of the second housing mating portion 22. The guide rib 21*b* is formed on the outer wall surface of the second housing mating portion 22 opposite the second receiving slot 221, and the side plate 11*a* is against the outer wall surface of the second housing mating portion 22 opposite the second receiving slot 221.

In the illustrated embodiment, the first connector 1 includes a plurality of first terminals 13, and the second connector 2 includes a plurality of second terminals 23 that are respectively matched to the plurality of first terminals 13. Some first terminals 13 of the plurality of first terminals 13 are identical to some second terminals 23 of the plurality of second terminals 23, while others of the plurality of first terminals 13 are different from others of the plurality of second terminals 23. One of the first and second terminals 13 and 23 that are identical to each other and that match each other is inverted 180 degrees relative to the other.

However, the present invention is not limited to the illustrated embodiment. For example, in another exemplary embodiment of the present invention, the first connector 1 includes a plurality of first terminals 13, and the second connector 2 includes a plurality of second terminals 23 that are respectively matched to the plurality of first terminals 13. All first terminals 13 and all second terminals 23 are identical, and one of the first and second terminals 13 and 23 that match each other is inverted 180 degrees relative to the other.

In the illustrated embodiment, the first terminal 13 and the second terminal 23 are stamped terminals, and all the first terminals 13 and all the second terminals 23 are identical to each other when deployed to a flat state. Therefore, the same stamping die can be used when stamping a terminal strip, greatly reducing the manufacturing cost of the terminals.

As shown in FIGS. 1, 4, and 7, the first terminal 13 also has a first terminal extension portion 132, the first terminal extension portion 132 and the first terminal mating portion 131 are respectively connected to both ends of the first terminal fixing portion 130, and the first terminal extension portion 132 extends from the rear end of the first housing 10 to be electrically connected to the first circuit board. The second terminal 23 also has a second terminal extension portion 232 and the second terminal mating portion 231 are respectively connected to both ends of the second terminal fixing portion 230, as shown in FIG. 8. The second terminal extension portion 232 extends from the rear end of the second housing 20 and is electrically connected to the second circuit board.

In the illustrated embodiment, the first terminal extension portions 132 of some first terminals 13 in the plurality of first terminals 13 are identical to the second terminal extension portions 232 of some second terminals 23 in the plurality of second terminals 23. The first terminal extension portions 132 of other first terminals 13 in the plurality of first terminals 13 are different from the second terminal extension portions 232 of other second terminals 23 in the plurality of second terminals 23.

As shown in FIGS. 1 to 4, in the illustrated embodiment, the first connector 1 also includes a first holder 14, a first mounting chamber 110 is formed at the rear end of the first housing 10, the first holder 14 is installed in the first mounting chamber 110, the first terminal extension portion 132 passes through the first holder 14, and a portion of the first end sub extension 132 is fixed to the first holder 14. The second connector 2 also includes a second holder 24, and a second mounting chamber 210 is formed at the rear end of the second housing as shown in FIG. 5. The second holder 24 is installed in the second mounting chamber 210. The second terminal extension portion 232 passes through the second holder 24 and a portion of the second terminal extension portion 232 is fixed to the second holder 24.

As shown in FIG. 4, a first convex portion 111 is formed on the inner wall surface of the first mounting chamber 110, and a first concave portion 141 is formed on the outer wall surface of the first holder 14. The first convex portion 111 engages with the first concave portion 141 to hold the first holder 14 in the first mounting chamber 110. A second convex portion 211 is formed on the inner wall surface of the second mounting chamber 210, and a second concave portion 241 is formed on the outer wall surface of the second holder 24. The second convex portion 211 engages with the second concave portion 241 to hold the second holder 24 in the second mounting chamber 210.

In the illustrated embodiment, the first holder 14 and the second holder 24 are identical, so that the first holder 14 and the second holder 24 are interchangeable.

In an embodiment, the connector assembly further includes a first circuit board and a second circuit board. The first connector 1 is installed on the first circuit board, and the first terminal extension portion 132 of the first terminal 13 is electrically connected to the first circuit board. The second connector 2 is installed on the second circuit board, and the second terminal extension portion 232 of the second terminal 23 is electrically connected to the second circuit board.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:

a first connector including a first housing and a first terminal arranged in the first housing, the first terminal includes a first terminal mating portion and a first terminal fixing portion connected to the first terminal mating portion and fixed in the first housing, the first housing has a first main housing and a first housing mating portion protruding from a front end of the first main housing, the first terminal mating portion is arranged in the first housing mating portion, the first terminal fixing portion is fixed in the first main housing; and a second connector including a second housing and a second terminal arranged in the second housing, the second terminal includes a second terminal mating portion that corresponds to the first terminal mating portion and a second terminal fixing portion connected to the second terminal mating portion and fixed in the second housing, the first terminal mating portion is identical to the second terminal mating portion but is inverted 180 degrees relative to the second terminal mating portion, the first terminal fixing portion is identical to the second terminal fixing portion, the second housing includes a second main housing and a second housing mating portion protruding from a front end of the second main housing, the second terminal mating portion is arranged in and mated with the second housing mating portion, the second terminal fixing portion is fixed in the second main housing.

2. The connector assembly according to claim 1, wherein the first connector includes a plurality of first terminals, and the second connector includes a plurality of second terminals that are respectively matched with the plurality of first terminals, some first terminals of the plurality of first terminals are identical to some second terminals of the plurality of second terminals, and other first terminals of the plurality of first terminals are different from other second terminals of the plurality of second terminals, one of the first terminals and one of the second terminals that are identical to each other and that match each other is inverted 180 degrees relative to the other.

3. The connector assembly according to claim 2, wherein the first terminal has a first terminal extension portion, the first terminal extension portion and the first terminal mating portion are respectively connected to a pair of ends of the first terminal fixing portion, the first terminal extension portion extends out of a rear end of the first housing to electrically connect a first circuit board;

the second terminal has a second terminal extension portion, the second terminal extension portion and the second terminal mating portion are respectively connected to a pair of ends of the second terminal fixing portion, the second terminal extension portion extends out of a rear end of the second housing to electrically connect a second circuit board.

4. The connector assembly according to claim 3, wherein the first terminal extension portions of some first terminals in the plurality of first terminals are identical to the second terminal extension portions of some second terminals in the plurality of second terminals, the first terminal extension portions of other first terminals in the plurality of first terminals are different from the second terminal extension portions of other second terminals in the plurality of second terminals.

5. The connector assembly according to claim 3, wherein a first mounting chamber is formed at the rear end of the first housing, the first connector includes a first holder installed in the first mounting chamber, the first terminal extension portion passes through the first holder, and a portion of the first terminal extension portion is fixed to the first holder; and a second mounting chamber is formed at the rear end of the second housing, the second connector includes a second holder installed in the second mounting chamber, the second terminal extension portion passes through the second holder and a portion of the second terminal extension portion is fixed to the second holder.

6. The connector assembly according to claim 5, wherein a first convex portion is formed on an inner wall surface of the first mounting chamber, and a first concave portion is formed on an outer wall surface of the first holder, the first convex portion engages with the first concave portion to hold the first holder in the first mounting chamber; and a second convex portion is formed on an inner wall surface of the second mounting chamber, and a second concave portion is formed on an outer wall surface of the second holder, the second convex portion engages with the second concave portion to hold the second holder in the second mounting chamber.

7. The connector assembly according to claim 5, wherein the first holder and the second holder are identical to each other and are interchangeable.

8. The connector assembly according to claim 3, further comprising:

a first circuit board on which the first connector is installed; and a second circuit board on which the second connector is installed, the first terminal extension portion of the first terminal is electrically connected to the first circuit board, the second terminal extension portion of the second terminal is electrically connected to the second circuit board.

9. The connector assembly according to claim 1, wherein the first connector includes a plurality of first terminals, the second connector includes a plurality of second terminals that are respectively matched with the plurality of first terminals, all first terminals and all second terminals are identical to each other, and one of the first terminals and one of the second terminals that are matched to each other is inverted 180 degrees relative to the other.

10. The connector assembly according to claim 1, wherein the first terminal and the second terminal are stamped terminals, and the first terminal and the second terminal are identical to each other when they are deployed to a flat state.

11. The connector assembly according to claim 1, wherein a receiving cavity is formed in the second housing mating portion, the first housing mating portion is inserted into the receiving cavity of the second housing mating portion, a first receiving slot is formed on an outer wall surface of the first housing mating portion, the first terminal mating portion is accommodated in the first receiving slot, a second receiving slot is formed on an inner wall surface of the second housing mating portion, the second terminal mating portion is accommodated in the second receiving slot.

12. The connector assembly according to claim 11, wherein the first terminal mating portion is a bent first elastic arm, the first terminal mating portion has a first contact portion protruding from the first receiving slot, the second terminal mating portion is a bent second elastic arm, the second terminal mating portion has a second contact portion protruding from the second receiving slot, the first contact portion is in electrical contact with the second contact portion.

13. The connector assembly according to claim 12, wherein the first terminal mating portion has a first connecting portion and a first end portion respectively located at a pair of ends thereof, the first connecting portion and the first end portion are movably supported on a bottom wall surface of the first receiving slot to allow elastic deformation of the first terminal mating portion, the second terminal mating portion has a second connecting portion and a second end portion respectively located at a pair of ends thereof, the second connecting portion and the second end portion are movably supported on a bottom wall surface of the second receiving slot to allow elastic deformation of the second terminal mating portion.

14. The connector assembly according to claim 13, wherein a first limit hole is formed on an end surface of the first housing mating portion and is in communication with the first receiving slot, the first end portion of the first terminal mating portion is restricted in the first limit hole, a second limit hole is formed on an end surface of the second housing mating portion and is in communication with the second receiving slot, the second end portion of the second terminal mating portion is restricted in the second limit hole.

15. The connector assembly according to claim 13, wherein the first connecting portion is connected between the first terminal fixing portion and the first contact portion and is bent into a V-shaped shape, the second connecting portion is connected between the second terminal fixing portion and the second contact portion and is bent into a V-shaped shape.

16. The connector assembly according to claim 15, wherein the first housing has a pair of side plates connected to an end of the first main housing, the pair of side plates are located on a pair of sides of the first housing mating portion and spaced apart from the first housing mating portion, a pair of grooves are formed on an outer wall surface of the second main housing that are respectively matched with the pair of side plates, the pair of side plates are respectively inserted into the pair of grooves, the second housing mating portion is inserted between the pair of side plates, the pair of side plates are respectively against the outer wall surface of a pair of sides of the second housing mating portion.

17. The connector assembly according to claim 16, wherein a guide groove is formed on at least one of the pair of side plates and a convex guide rib is formed on the outer wall surface of the second housing mating portion, the guide rib is mated with the guide groove to guide the first housing mating portion into the receiving cavity of the second housing mating portion.

18. The connector assembly according to claim 17, wherein the guide rib is formed on the outer wall surface of the second housing mating portion opposite the second receiving slot, one of the side plates is against the outer wall surface of the second housing mating portion opposite the second receiving slot.

19. A connector assembly, comprising:

a first connector including:

a first housing having a first mounting chamber formed at the rear end of the first housing;

a first holder installed in the first mounting chamber;

a first terminal arranged in the first housing, the first terminal including:

a first terminal mating portion; and a first terminal extension portion passing through the first holder and a portion of the first terminal extension portion is fixed to the first holder, the first terminal extension portion and the first terminal mating portion are respectively connected to a pair of ends of a first terminal fixing portion, the first terminal extension portion extends out of a rear end of the first housing to electrically connect a first circuit board; and a plurality of first terminals; and a second connector including:

a second housing having a second mounting chamber formed at the rear end of the second housing;

a second holder installed in the second mounting chamber;

a second terminal arranged in the second housing, the second terminal including:

a second terminal mating portion that corresponds to the first terminal mating portion, the first terminal mating portion is identical to the second terminal mating portion but is inverted 180 degrees relative to the second terminal mating portion; and a second terminal extension portion passing through the second holder and a portion of the second terminal extension portion is fixed to the second holder, the second terminal extension portion and the second terminal mating portion are respectively connected to a pair of ends of a second terminal fixing portion, the second terminal extension portion extends out of a rear end of the second housing to electrically connect a second circuit board; and a plurality of second terminals that are respectively matched with the plurality of first terminals, some first terminals of the plurality of first terminals are identical to some second terminals of the plurality of second terminals, and other first terminals of the plurality of first terminals are different from other second terminals of the plurality of second terminals, one of the first terminals and one of the second terminals that are identical to each other and that match each other is inverted 180 degrees relative to the other.

* * * * *